Patented June 4, 1935

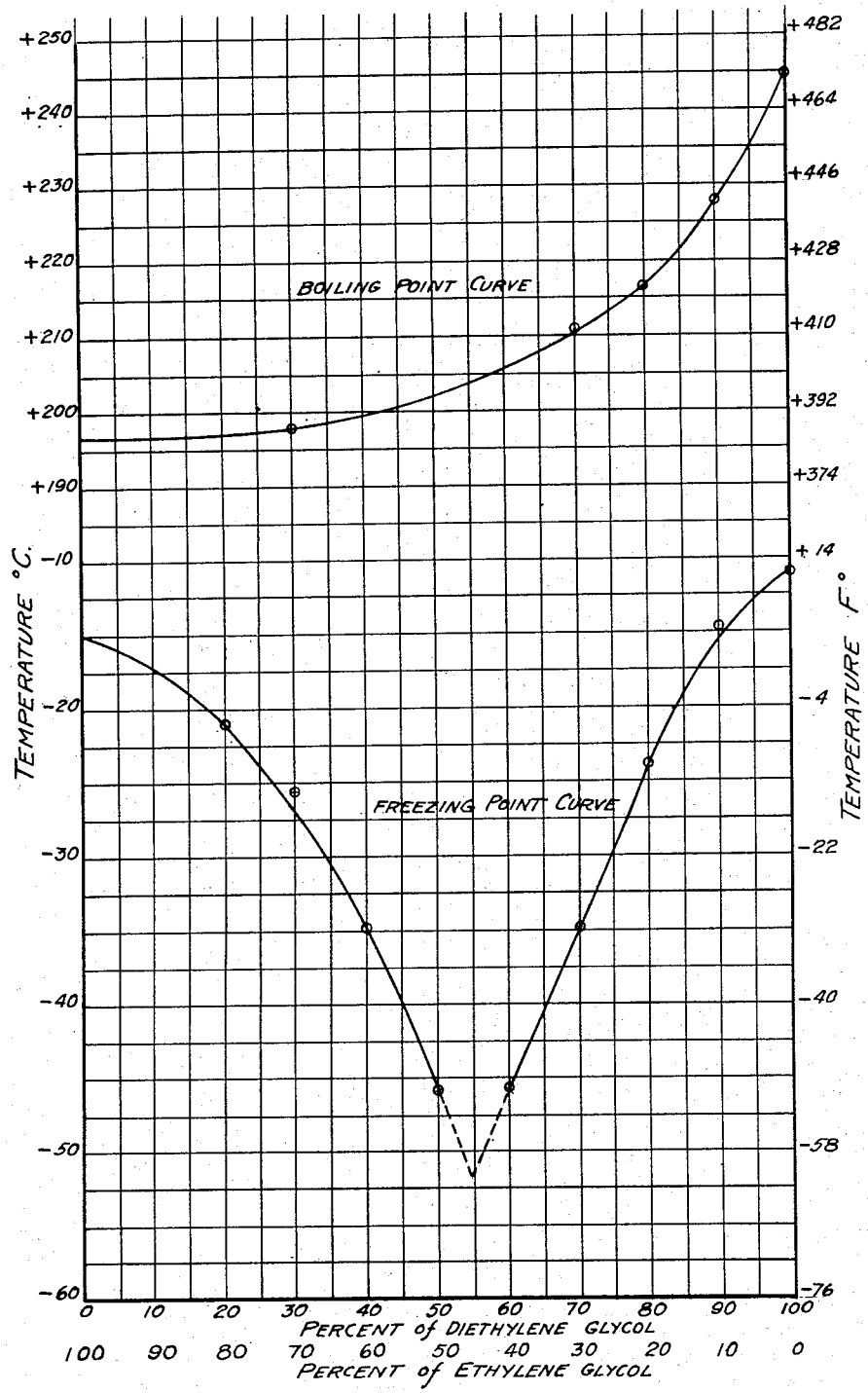

2,003,662

UNITED STATES PATENT OFFICE 2,003,662

LIQUID MEDIUM FOR HEAT AND PRESSURE TRANSFER

Henry L. Cox, South Charleston, W. Va., and Leo J. Clapsadle, Buffalo, N. Y., assignors to Carbide and Carbon Chemicals Corporation, a corporation of New York Application September 16, 1930, Serial No. 482,370

3 Claims. (Cl. 252—5)

The invention is a liquid composition of matter useful as a medium for the transfer of heat in heating and cooling systems of various kinds, for example the cooling systems of internal combustion engines; for the transfer of pressure in hydraulically operated devices, such as brakes, lifts, shock absorbers, and gun recoil mechanisms; and for other purposes.

It is now the general practice to prepare media for such purposes as those mentioned by adding to water a substance adapted to depress the freezing point, thus insuring fluidity of the medium at low temperatures. Mixtures so prepared may boil below the boiling point of water, as where ethyl alcohol is used as the freezing point depressant; or they may boil slightly above the ebullition point of water, as where ethylene glycol is used as the antifreeze. In some types of apparatus, and particularly in aeronautical motors designed for high-temperature operation, the range of fluidity afforded by aqueous mixtures is inadequate, and excessive evaporation of the medium may occur at operating temperatures. Many unitary substances having a sufficiently high boiling point are available, but these congeal at or above the lowest atmospheric temperatures.

We have found that a high-boiling liquid maintaining its fluidity at temperatures far below the freezing point of water can be prepared by mixing ethylene glycol with diethylene glycol. We prefer mixtures which are anhydrous, or substantially so, containing so little water that their volatility is not materially increased thereby. An anhydrous binary mixture of the glycol and the diglycol containing 40% of the latter freezes at about −30° F., and boils at about 390° F. at atmospheric pressures. With larger percentages of the diglycol, the boiling point is still higher, while the freezing-point continues to fall until the percentage of the diglycol reaches about 55% after which it gradually rises. The eutectic mixture remains liquid below −50° F.

The boiling and freezing points of binary mixtures of ethylene glycol with diethylene glycol are shown in the accompanying drawing.

The compositions of the invention are non-corrosive to metals, are not chemically decomposed by heat, and are free from offensive fumes or odors. It will be obvious that other substances can be added to the binary mixtures described by way of illustration, without destroying the desirable properties.

We claim:—

1. A substantially anhydrous liquid medium consisting essentially of ethylene glycol and diethylene glycol in the proportions of from about 40% to about 70% of diethylene glycol.

2. A substantially anhydrous liquid heat-transfer medium consisting substantially of ethylene glycol and diethylene glycol, and containing at least about 40% of the diglycol.

3. A substantially anhydrous liquid heat-transfer medium consisting of approximately equal proportions of ethylene glycol and diethylene glycol.

HENRY L. COX.
LEO J. CLAPSADLE.